(12) United States Patent
Dames

(10) Patent No.: US 7,876,981 B2
(45) Date of Patent: Jan. 25, 2011

(54) OPTICAL SWITCH

(75) Inventor: Andrew Nicholas Dames, Cambridge (GB)

(73) Assignee: Polatis Ltd., Cambridge (GB)

( * ) Notice: Subject to any disclaimer, the term of this patent is extended or adjusted under 35 U.S.C. 154(b) by 636 days.

(21) Appl. No.: 11/572,132

(22) PCT Filed: Jul. 15, 2005

(86) PCT No.: PCT/GB2005/002778

§ 371 (c)(1),
(2), (4) Date: Jan. 16, 2008

(87) PCT Pub. No.: WO2006/008483

PCT Pub. Date: Jan. 26, 2006

(65) Prior Publication Data

US 2009/0257709 A1 Oct. 15, 2009

(30) Foreign Application Priority Data

| Jul. 15, 2004 | (GB) | ................................. | 0415847.3 |
| Jul. 15, 2004 | (GB) | ................................. | 0415848.1 |
| Apr. 15, 2005 | (GB) | ................................. | 0507636.9 |

(51) Int. Cl.
G02F 1/01 (2006.01)
(52) U.S. Cl. .................. 385/1; 385/20; 385/16
(58) Field of Classification Search ............... 385/1, 385/16–22
See application file for complete search history.

(56) References Cited

U.S. PATENT DOCUMENTS

| 4,657,339 | A | | 4/1987 | Fick |
| 4,896,935 | A | | 1/1990 | Lee |
| 5,436,986 | A | | 7/1995 | Tsai |
| 5,546,180 | A | * | 8/1996 | Garel-Jones et al. ....... 356/73.1 |
| 6,005,998 | A | | 12/1999 | Lee |
| 6,335,993 | B1 | | 1/2002 | Takahashi |
| 6,456,751 | B1 | | 9/2002 | Bowers et al. |
| 6,567,574 | B1 | * | 5/2003 | Ma et al. ....................... 385/16 |
| 6,859,120 | B2 | | 2/2005 | Sweatt et al. |
| 2002/0003919 | A1 | | 1/2002 | Morimoto |
| 2003/0072520 | A1 | | 4/2003 | Wu et al. |
| 2003/0142900 | A1 | * | 7/2003 | Laor et al. ..................... 385/18 |
| 2004/0207893 | A1 | * | 10/2004 | Miller et al. ................. 359/212 |
| 2005/0018958 | A1 | * | 1/2005 | Huang et al. .................. 385/18 |
| 2007/0098321 | A1 | * | 5/2007 | Oikawa et al. ................ 385/18 |
| 2008/0253715 | A1 | * | 10/2008 | Dames ......................... 385/18 |

FOREIGN PATENT DOCUMENTS

| CA | 2 386 309 A1 | 11/2003 |
| EP | 0 496 224 A2 | 7/1992 |
| JP | 58-72108 | 4/1983 |
| JP | 2001-135015 | 5/2001 |
| JP | 2004-287124 | 10/2004 |
| WO | WO 01/50176 A1 | 7/2001 |

* cited by examiner

Primary Examiner—Ellen Kim
(74) Attorney, Agent, or Firm—Workman Nydegger

(57) ABSTRACT

An optical switch comprises a plurality of input ports and a plurality of out port ports; a plurality of displaceable optical elements for directing beams from a selected input to a selected output; wherein the number of displaceable elements substantially corresponds to either the number of input ports or the number of output ports.

7 Claims, 6 Drawing Sheets

OPTICAL SWITCH

FIELD OF THE INVENTION

The invention relates to optical switches and in particular to optical switches with a plurality of input and output ports with a number of displaceable optical elements to effect switching between input and output ports.

BACKGROUND TO THE INVENTION AND PRIOR ART KNOWN TO THE APPLICANT

Three separate categories of prior art exit which constitute relevant background to the invention.

The first category of prior art is concerned with switches comprising only one displaceable optical element facing a plurality of fixed output ports. Many examples of this category of switches exist, for example: U.S. Pat. No. 6,335,993B1 (Takahashi) where the single mobile collimator is fixed to a disc rotating about its central axis; U.S. Pat. No. 4,896,935 (Lee) where a single displaceable collimator is rotatable to a series of radially extending collimators; and U.S. Pat. No. 657,339 (Fick) where a single displaceable fibre through a contraction of a 1 dimensional piezoelectric arrangement allows the fibre to bend in between two positions where fixed fibres are located. Other examples in this category may be structures with a single fixed input port and multiple fixed output port with a single optical element displaced to achieve switching such as JP2004287124 (Nin Sensho) and CA200223 86309 (Sun De-Gui).

A second category of prior art exists which shows multiple input and output switches with a number of actuators equaling the total number of ports. In other words, these often require the input and the output ports to be displaceable for switching to occur. WOO 1/50176 (Polatis) and U.S. Pat. No. 6,005,998 (Lee) both show at least one actuator per port. In other words, for a total of M+N ports, there are provided at least M+N actuators to displace optical elements. U.S. Pat. No. 6,859,120 (Sweatt William et al) also shows a system using actuators on both the input side and the output side of an optical switch.

A third category of switches relies on the use of at least two displaceable optical elements between fixed arrays of input and output ports. For example, U.S. Pat. No. 6,456,751B1 (Bowers et al) shows the use of two micro-actuated arrays of mirrors. Another example can be found in JP2001350105 where a series of at least two moveable prisms is envisaged to switch a beam from one port to another in a multiple input and multiple output switch. This category of switches also requires at least the same number of actuated optical elements as their total number of ports.

Due to their large number of ports and requirement for a large number of actuators, these switches are therefore unnecessarily bulky requiring a large number of expensive actuators which will also need precise control.

SUMMARY OF THE INVENTION

In a first broad independent aspect, the invention provides an optical switch comprising: a plurality of input ports and a plurality of output ports; a plurality of displaceable optical elements for directing beams from a selected input to a selected output; wherein the number of displaceable elements substantially corresponds to either the number of input ports or the number of output ports. This structure is particularly advantageous because it reduces dramatically the number of actuators necessary for multiple input and output port switching. It therefore allows switches with greater compactness and cost efficiency to be built. It will also require less complex control systems as less moveable components will be required.

In a subsidiary aspect in accordance with the invention's first broad independent aspect, said plurality of said input ports and said plurality of output ports are fixed in position; and the switch comprises: a first reflective arrangement for capturing a beam from an input port and directing a beam towards a second reflective arrangement for capturing a beam exiting from said first reflective arrangement and directing a beam to an output port; wherein one of said reflective arrangements is said displaceable optical element whilst in communication with its corresponding reflective arrangement which is fixed and a plurality of pairs of first and second reflective arrangements are provided to direct a beam from a selected input port to a selected output port.

This configuration is particularly advantageous because it allows high quality switching to be achieved from multiple input and output systems with greater compactness and cost efficiency compared with the switches having one actuator per port.

In a further subsidiary aspect, a first periscope prism for capturing a beam from an input port and directing a beam towards a second periscope prism for capturing a beam exiting from said first periscope prism and directing a beam to an output port; wherein one of said periscope prisms is said displaceable optical element whilst in communication with its corresponding periscope prism to direct a beam from a selected input port to a selected output port.

In a further subsidiary aspect, either or both of said reflective arrangement is a prism. This is particularly advantageous because it allows the optical performance of the switch to be independent of axial and radial positioning of the prisms. It also, due to the geometry of the periscope prism, restricts the tightest angles of tolerance in the system to be internal to the prisms which are currently of straightforward commercial manufacture.

In a further subsidiary aspect, said prism is a periscope prism.

In a further subsidiary aspect, the input ports and/or the output ports are disposed in respective arcs and said displacement is a rotation whilst the first and second reflective arrangements communicate along the axis of rotation. This allows particularly accurate switching to be achieved.

In a further subsidiary aspect, input ports and output ports arcs are concentric. This reduces the number of elements which would otherwise be necessary to achieve accurate switching.

In a further subsidiary aspect, both the first and second reflective arrangements of periscope prisms of different lengths corresponding to the radii of respective input port and output port arcs. This avoids light being communicated directly across from an input port to an output port without going through the periscope prism arrangements.

In a further subsidiary aspect, during switching a displaceable deflective arrangement is provided with means for displacing into a position where, during displacement, said arrangement does not interfere with communication between ports other than the objects switching ports.

In a further subsidiary aspect, one or more ports incorporate a rod lens which is supported in a flexure mount with at least two flexures extending from the lens to a support structure in a direction substantially perpendicular from the longitudinal axis of the rod lens; the flexures being spaced so that changes in their relative support positions result in changes in position of said rod lens.

In a further subsidiary aspect, a slotted prism is located in front of the inputs ports and/or the output ports. This allows a greater number of input/output ports to be used with the switch.

In a further subsidiary aspect, the displacement of said displaceable reflective arrangements is carried out by a plurality of rotary motors stacked substantially perpendicular to the longitudinal axis of the switch and a mechanism joins said rotary motors to said displaceable reflective arrangements so that the reflective arrangement rotates along the longitudinal axis of the switch. This allows the switch to be more compact than it would have been had the motors been placed in the longitudinal axis of the switch. This configuration will therefore further improve the overall compactness of the switch.

In a further subsidiary aspect, said plurality of input ports are fixed in position and said plurality of output ports are in optical communication with said input ports; the switch comprises: a first reflector for receiving optical beams from said input ports and directing said beams to said output ports; wherein the or each output port also incorporates a reflector with a passage to allow a beam to pass said reflector to exit through said output port and means are provided to displace either or both of said reflectors either in positions where beams are directed to one or more further output ports or in positions where an incoming beam is allowed to exit through the passage of said reflector.

This also allows only M actuators to be used in this switch to achieve switching between any input and output port.

In a further subsidiary aspect, the output reflector is displaceable by a 2 dimensional piezoelectric bending beam.

In a further subsidiary aspect, the output ports incorporate a passive array of ports in addition to said displaceable ports. This will allow a passive array when placed appropriately to capture any of the beams which were not captured by the output ports.

In a further subsidiary aspect, a diffractive grating is provided in said switch. This would allow the switch to be a frequency selective switch.

In a second broad independent aspect, the invention provides an actuator comprising two 2 dimensional piezoelectric bending beams attached to a support structure; wherein the beams can jointly act on an element to position said element. This is particularly useful to accurately place collimators in an input and output array prior to commissioning the switch.

In a further subsidiary aspect, the actuator is adapted to position the input and/or output ports of an optical switch as defined in the first broad independent aspect.

In a third broad independent aspect, the invention provides an optical switch comprising: a plurality of input ports and a plurality of output ports which, in use, are fixed in position; a first reflective arrangement for capturing a beam from an input port and directing a beam towards a second reflective arrangement for capturing a beam exiting from said first reflective arrangement and directing a beam to an output port; wherein one of said reflective arrangements is displaceable whilst in communication with its corresponding reflective arrangement which is fixed and a plurality of pairs of first and second reflective arrangements are provided to direct a beam from a selected input port to a selected output port.

In a fourth broad independent aspect, the invention provides an optical switch comprising: a plurality of input ports and a plurality of output ports; a first periscope prism for capturing a beam from an input port and directing a beam towards a second periscope prism for capturing a beam exiting from said first periscope prism and directing a beam to an output port; wherein one of said periscope prisms is said displaceable optical element whilst in communication with its corresponding periscope prism to direct a beam from a selected input port to a selected output port.

In a fifth broad independent aspect, the invention provides: an optical switch comprising: a plurality of input ports which, in use, are fixed in position and a plurality of output ports in optical communication with said input ports; a first reflector for receiving optical beams from said input ports and directing said beams to said output ports; wherein the or each output port also incorporates a reflector with a passage to allow a beam to pass said reflector to exit through said output port and means are provided to displace either or both of said reflectors either in positions where beams are directed to one or more further output ports or in positions where an incoming beam is allowed to exit through the passage of said reflector.

DETAILED DESCRIPTION OF THE FIGURES

Figure 1:
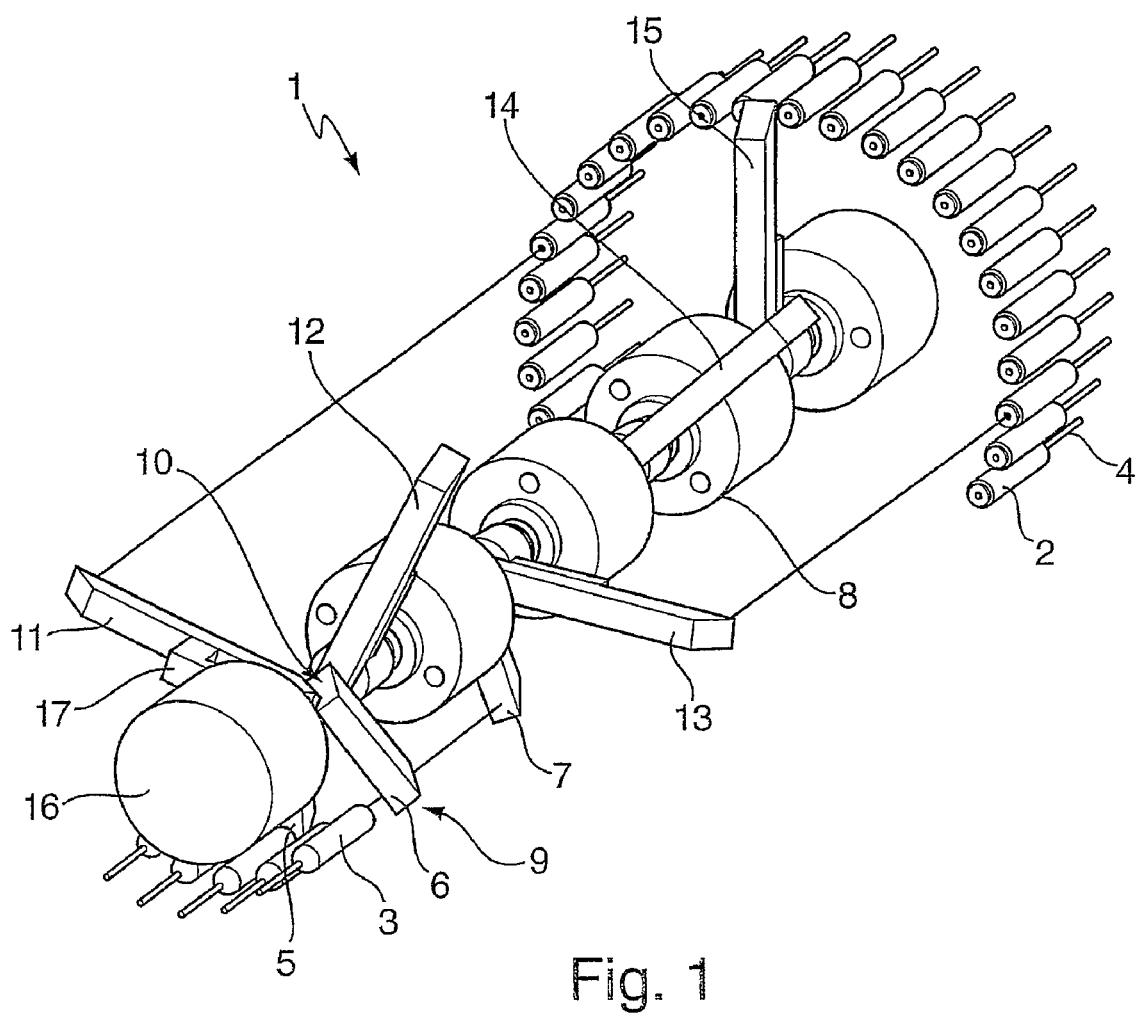
FIG. 1 shows a perspective view of a switch in accordance with a first embodiment of the invention using periscope prisms.

FIG. 1 shows an optical concept switch generally referenced 1 having 24 input ports such as that referenced 2 and output ports such as that referenced 3. In this embodiment, the ports comprise rod lens collimators attached to corresponding fibres such as that referenced 4. Both the input and output ports are fixed when in use. In practice, each port may be adjusted during assembly for accurate optical communication across the switch. Each output port 3 has a corresponding fixed periscope prism. These are respectively referenced 5, 6, 7 and 8 (only the lowest most extremity of prism 8 can be seen in the figure). Each periscope prism such as that referenced 6 incorporates two diagonal faces 9 and 10 which reflect light to change its direction. The periscope prisms are also elongate in order to have a length which is several times their width. In this embodiment, the fixed prisms are approximately half the length of corresponding mobile prisms respectively referenced 11, 12, 13, 14 and 15. Mobile prism 11 is attached and linked to a stepper motor 16 via a linkage arm 17 extending perpendicularly to the axis of rotation of the motor. Linkage arm 17 attaches the prism at approximately the halfway point of the prism. The radius of prism 11 is shown to correspond to the radius of the input ports arc so as to be able to select any of the input ports.

The lower extremities of a mobile prism and its corresponding fixed prism are placed in overlap in communication with one another so that a beam of light passes from the mobile prism to the fixed prism towards an output. The fixed prisms are selected to be of a radius to correspond with the arc of the output ports. The radius of the fixed prisms is selected to be different from the radius of the mobile prisms in order to achieve enhanced compactness.

This arrangement allows a constant article pack length for all connections to be achieved. Periscope prisms also have the benefit that the stricter angle tolerances of the system are actually internal to the prism which is itself of straightforward commercial manufacture. A further benefit is that the optical performance is independent of axial and radial positioning of the prism. All that is required is that the axis of rotation of the prisms are concentric, which is a strict tolerance requirement, but can be met applying, commercially known, position gear head tolerancing.

One possible actuating motor may have 20 steps per revolution through a 120:1 precision zero-backlash gear head, giving a step size of 0.15° without micro-stepping. On the end of a 12 mm radius arm prism, this translates into 30 micron steps, which provide the system with sufficient fine resolution and acceptable loss contribution.

The input ports in this embodiment may incorporate 24 collimators on a 2 mm pitch with a 12 mm arc radius. The prisms may be 1 mm by 1 mm by 13 mm and have a 12 mm beam displacement via the two 45° end facets. The stepper zero point may be set using a hall sensor and small magnet, detecting the flux reversal as the prism and magnet pass over. Other potential switches are envisaged. A switch may have for example an input port arc and an output arc where each arc incorporates a plurality of collimators. Each arc may support a number of collimator ports. Both the input and output ports may be designed to be fixed once in use. Between the input and output ports, there may be provided two different kinds of mobile switching elements. One mobile switching element may comprise a rotary motor whose shaft may be driven to a variety of precise angular positions. The shaft can be attached to a mobile prism by the use of a disc incorporating a slot sized and configured to receive the prism. Also attached to the disc, there may be provided an arm diametrically opposite to the prism which holds at its extremity a magnet. A magnet may form a part of a Hall-effect sensor located on the lower part of a rotor support member. Instead of a Hall-effect sensor arrangement, in order to reduce set up time and improve accuracy, an encoding device can be included on each rotating prism shaft, such as a printed circuit board based inductive or capacitive encoder.

A rotating prism will transfer a beam of light to a fixed prism onto a collimator. Communication between collimator and a central collimator of an opposite port array may be established by simply using one mobile prism arrangement. The central collimator for this embodiment cannot be seen in the figure but would be located precisely along the axis of rotation of prism.

Instead of the rotary motors shown in the figure, servo motors may be used if appropriate. To retain adequate rotation across the switch, it is envisaged to use either a gear head with efficiency below 50% or add a friction plate to the output or even have an actuator to release a brake on the output. If even faster speeds are needed, direct electro-mechanical drives can be used (i.e. no gear head, the prism being attached directly to the shaft). It is also envisaged to use a piezoelectric disc motor which would form a very compact actuator or alternatively, to use a piezo-inch worm array driving the edge of the wheel or disc which the prism is mounted on.

Each collimator would be held within a ring by being secured to a first flexure plate for securing the front of a collimator and a flexure plate for securing the rear of a collimator. The collimators would be secured to the flexure via eyes appropriately placed on the flexure. The flexures may be clamped between a central ring and a front removable ring whilst the flexure plate will be clamped between a central ring and a rear ring. The rings may be joined together by screw thread mechanisms or any other appropriate mechanism. A cut-out may be provided within each flexure plate as well as two further eyes, at the upper outer most region of the flexure plates. These may be used to adjust the position of the collimator relative to its support structure in order to optimise optical communication across the switch.

An alternative switch may comprise an input array associated with a clustered output array. Each collimator of a first array may correspond to a fixed periscope prism in communication with a rotatable periscope prism which has a radius selected to capture a beam originating from any of the input collimators of another array. The collimators in the input array may be interleaved by a series of prisms forming together a slotted prism so that, when the periscope prism rotates about the axis of the switch, it captures light beams alternatively from an arc of collimators and a prisms arc. The individual moveable periscope prism discs may be driven by a gearing mechanism with the actual motor being located to the side of the discs in order to achieve maximum compactness.

A further optical switch may be constructed which has approximately 24 input ports operating in conjunction with 5 output ports. The port may incorporate a rod lens collimator attached to a fibre which is supported via two flexures to a ring shaped support member. Each other collimator is equally supported to its corresponding support structure. Each exit port may be in optical communication with a periscope prism which is fixed in use and positioned to capture a beam of light from the switch's central axis and reflect the beam towards the output port. Each fixed prism will operate with a mobile prism rotatable about the central axis of the switch in order to pick up beams emitted from any of the input ports.

A periscope prism may be attached to a rotary disc. The rotary disc may have a number of apertures in its outer most periphery allowing beams of light to traverse the disc when appropriate. A disc driving wheel may engage the disc and may itself be driven by a worm gear directly attached to the axle of a rotary motor such as a stepper motor. A wheel, a worm gear and a rotary motor may operate together. A switch may incorporate five displacement mechanisms. These may be held together through a series of longitudinal beams. Each ring may comprise a number of projections with an eye to allow the insertion of an appropriate beam.

The switches may be constructed in modular form. A switch may be formed incorporating 20 intermediate actuators instead of 5 actuators as previously discussed. Each actuator may incorporate a fixed disc to which is attached a prism for capturing a beam of light from a port and directing light towards the central switch axis. Each actuator may also incorporate a displaceable disc carrying a second prism displaceable to direct light towards a port. Each individual actuator unit may attach either to its neighbouring actuators or to an end support structure in an interlocking relationship as projection of end support unit engages a projection of an actuator unit.

The switch may be designed to have 96 ports by 20 ports.

Figure 2:
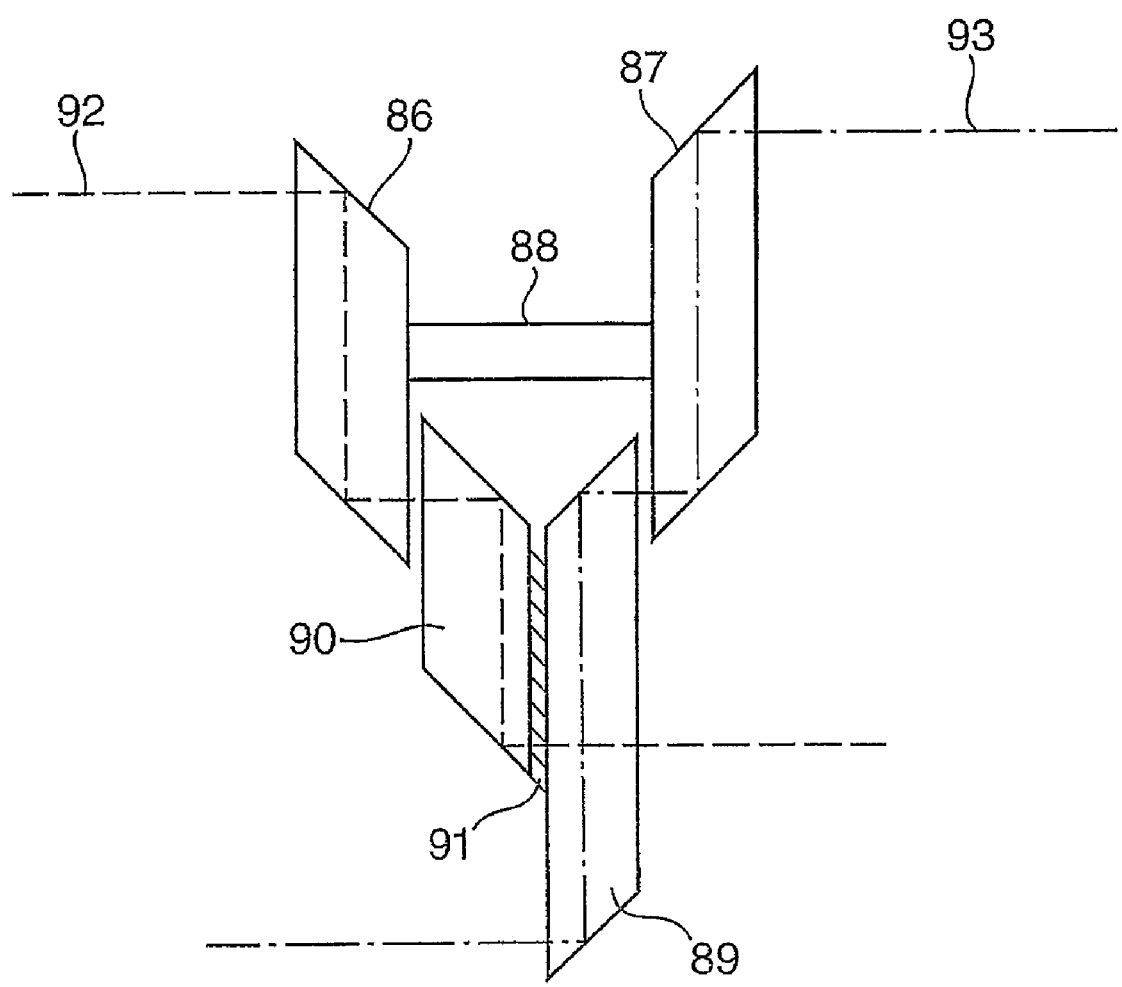
FIG. 2 shows a further embodiment of the invention using pairs of periscope prisms displaceable together.

FIG. 2 shows an alternative arrangement of actuated prism pairs. In this configuration, two prisms are driven in conjunction. Prism 86 and 87 are rotated as axle 88 is rotated. A second pair of prism respectively referenced 89 and 90 are joined together by an optical bond 91. This system allows the deflection of light as illustrated by the dashed line 92 and the dashed dot line 93.

Figure 3:
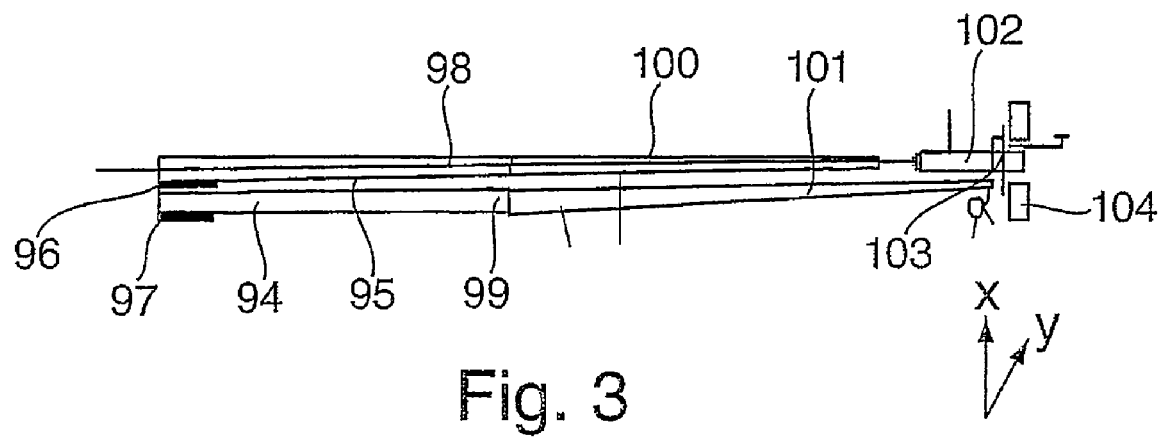
FIG. 3 shows a four axis actuator used in an optical switch.
Figure 4:
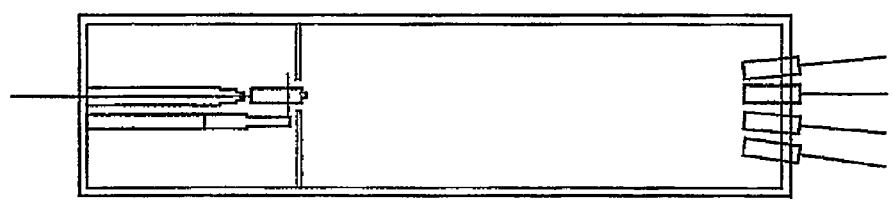
FIG. 4 shows a plan view of a four axis actuator used in a 1 by 16 switch.

Optical elements in switches and filters such as collimators require precise positioning to couple light efficiently. FIG. 3 shows the use of two 2 dimensional piezoelectric actuators located substantially parallel, one to another; piezo-actuator beams 94 and 95. These beams supported at their rear most extremities to any appropriate support structure 96 and 97. The piezoelectric beams at their front most extremities 98 and 99 attach to respective extension rods 100 and 101. Extension rod 101 attaches to the collimator 102 via its mount 103 comprising a double flexure arrangement of known kind. Each 2D piezoelectric beam is, in one possible embodiment 31 mm in length and capable of +/−125 microns displacement at the tip in both X and Y directions. Extension rod 100 may be designed to drive fibre resulting in, for example, +/−375 microns displacement; and the extension rod 101 has a length of 46 mm and is adapted to drive the end of the collimator giving +/−500 microns at its tip. This configuration can yield, for example, +/−0.2 mm displacement and +/−0.3 mm/10 mm radian tilt about the fibre end of the collimator. With a 130 mm optical path this gives a coverage of +/−4 mm in the X and Y directions, with a +/−200 microns precision needed over a 100 mm path length (2 mrad, or 0.12°) on passive collimator alignment. This is appropriate for a 1 by 16 switch as shown, for example, in FIG. 4.

The sensing of position and angle can be carried out by a set of 8 electrodes on the sensor plate such as those illustrated as 104 in the figure. These may be excited by separate signals from a signal generator, four being around the hole through which the tip of the collimator passes and another four being on the flat portion of the sensor plate facing a metal plate sensor ring electrically coupled to the collimator and hence the sensor output amplifier. The invention also envisages the use of a combination of two 2 dimensional piezoelectric actuators of the kind shown, for example, in FIG. 3 as a tool for finely adjusting the position of collimators in the switches prior to using the switch or during a service of the switch. One such pair may be sufficient for each input and output ring for sequentially tuning the position of the fixed ports.

Figure 5:
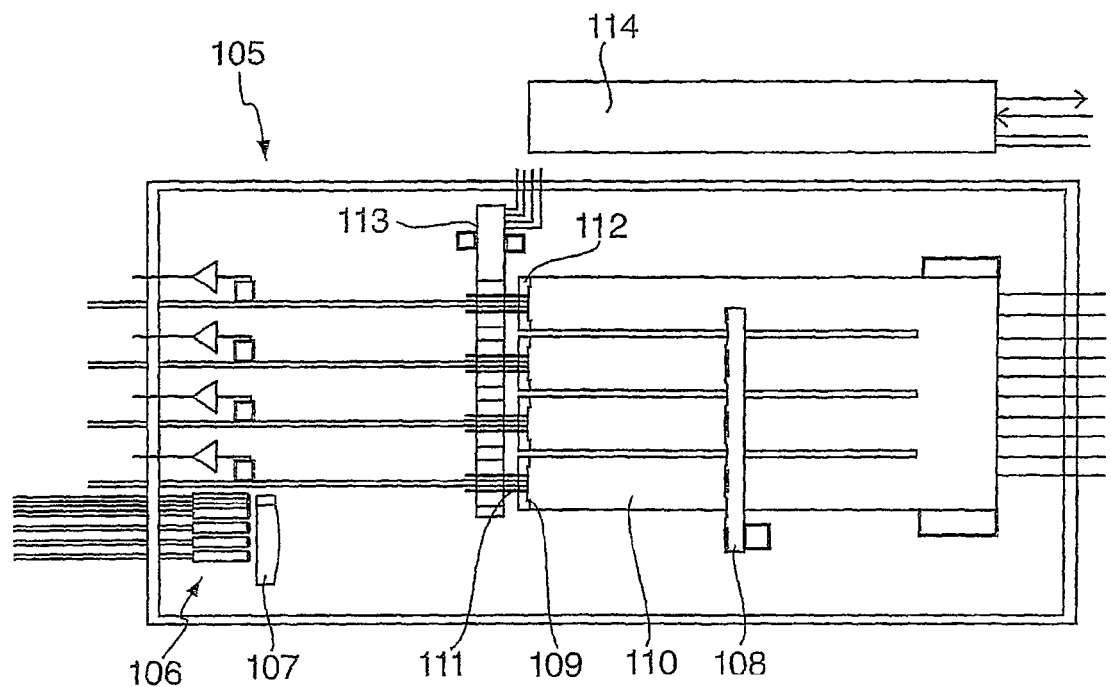
FIG. 5 shows an asymmetrical switch in plan view.
Figure 6:
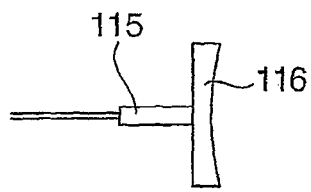
FIG. 6 shows a plan view of an output displaceable mirror and collimator arrangement.
Figure 7:
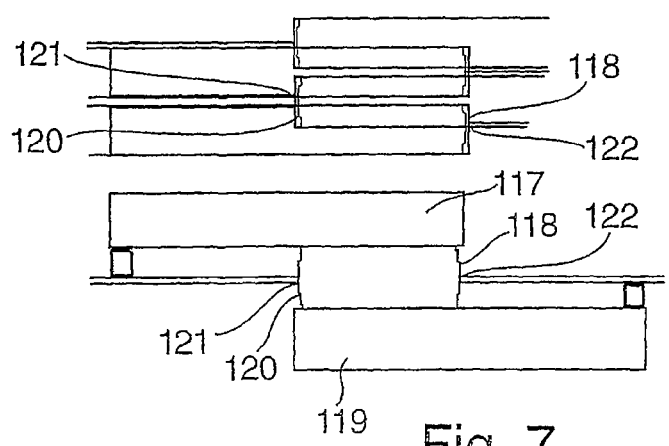
FIG. 7 shows a further embodiment of the asymmetric switch of FIG. 5.

FIGS. 5, 6 and 7 show further embodiments of compact M by N switches with only M actuators for M+N collimators.

Switch 105 has 16 in/out ports 106; each port having its own collimator and fibre. These ports form part of a passive array. The beams exiting the array pass through a lens 107 used to focus the beams onto a point on the fixed mirror 108. The fixed mirror, despite being shown as a mirror with concave portions, may in fact be a plane mirror. This mirror will deflect light towards a concave mirror 109 in a pattern such that the 2D piezoelectric actuator 110 can position the unmetallised aperture 111 in the concave lens (with the collimated fibre behind it) to intercept any of the beams it receives from the plane mirror. If no beams are directed towards a collimator plate in the aperture then these are re-directed towards the fixed mirror to the next concave lens. The beams will bounce back and forth between the fixed mirror and a concave mirror as any of these will be picked up by an aperture if adequately positioned. A further array of fixed collimators may be placed in optical communication with the last concave mirror 112 or the fixed mirror in order to capture beams of light which have not entered into any of the apertures. The concave lens/fibre assembly is mounted on the end of a 2 dimensional piezoelectric actuator of known land which effectively rotates the assembly about the centre of the actuator. The spherical surface of the mirror is centred at this rotation point, making the path of the reflect beams of the concave lens independent of the beam selected by the switch. A 2 dimensional capacitive sensor array 113 may be used to sense the position of optical elements and form a feedback loop with the control electronics 114 to the piezoelectric actuators so that the user may select desired switch settings. The fixed mirror 108 is an array of concave surfaces with a focal length equal to that of the moving mirrors 111. The switch illustrated is a 4 by 16 switch with single mode fibres (SMF 28, 1550 nm). The actuator beam length may be 31 mm with a cross-section of 1.5 mm square and an optical path length between the fixed and moving mirrors of 15.5 mm. The beam waist at centre of the path between mirrors has a Raleigh length 7.75 mm whilst the Gaussian beam diameter at mirrors is 80 microns. The separation between images at mirrors may be 160 microns. Displacement capacity of the actuators at their end may be +/−240 microns. The clear aperture in the moving mirror may be 160 microns square with a total aperture moving mirror of 1.3 mm square. Beam mirror/actuator pitch may be 2 mm. The output collimator wavefront may be adjusted for effective concave lens and thickness of uncoated mirror. The collimator array 106 may have a pitch of 0.25 mm with 25 mm from first fixed mirror lens element. Beam diameters may be 125 microns. The lens 107 may be a high index converging lens with a focal length of 24 mm.

The invention also envisages the use of conventional 1 dimensional piezoelectric actuators and sensors for a 1 dimensional passively aligned collimator array. The invention also envisages the use of fixed mirrors with a passive array of output collimators to collect any beams not switched onto the actuated ports. At the end of the array, the remaining beams can be reflected back through the switch to the input collimators if necessary.

The invention also envisages the use of a concave mirror/collimator assemblies which are fixed whilst the concave mirror elements of the fixed mirror can be individually tilted. This requires the mirrors around the collimators to have sufficient aperture to reflect the whole array image wherever the output fibre at the centre of the mirror is on the image of the array. This would also require tilting mirror elements to adjust to correct for the movement of the previous tilting mirror if the same outputs are to be maintained on non-switching ports. The fixed mirror can also be replaced with an identical set of actuated mirrors and output fibres.

The passive collimator array can be replaced by 1 dimensional vertical array of one or more collimators followed by a diffractive element and appropriate optics so that the beams converge on the same concave element on the fixed mirror. This provides a system which picks a desired wavelength out of a number of beams. As with the non-dispersive switch a similar (optic/dispersive element collimators) arrangement may be attached to the end of the switch to collect unused beams back into the fibre(s). Alternatively, a reflective element can be used to pass the signals back through the switch to re-use the diffraction grating and optics, passing the un-switched wavelengths back into the fibre.

FIG. 6 shows a fibre collimator 115 plus a mirror 116 in assembled form. FIG. 7 shows back-to-back actuators respectively in planned side view. In this configuration, a first piezoelectric beam 117 is attached to a mirror 118 whilst a second beam 119 is attached to a second mirror 120. In use, as the position of the mirror is adjusted, the switch selects which optical beam is permitted to pass through the aperture 121 whilst the remaining beams are deflected towards mirror 118 or its aperture 122.

Figure 8:
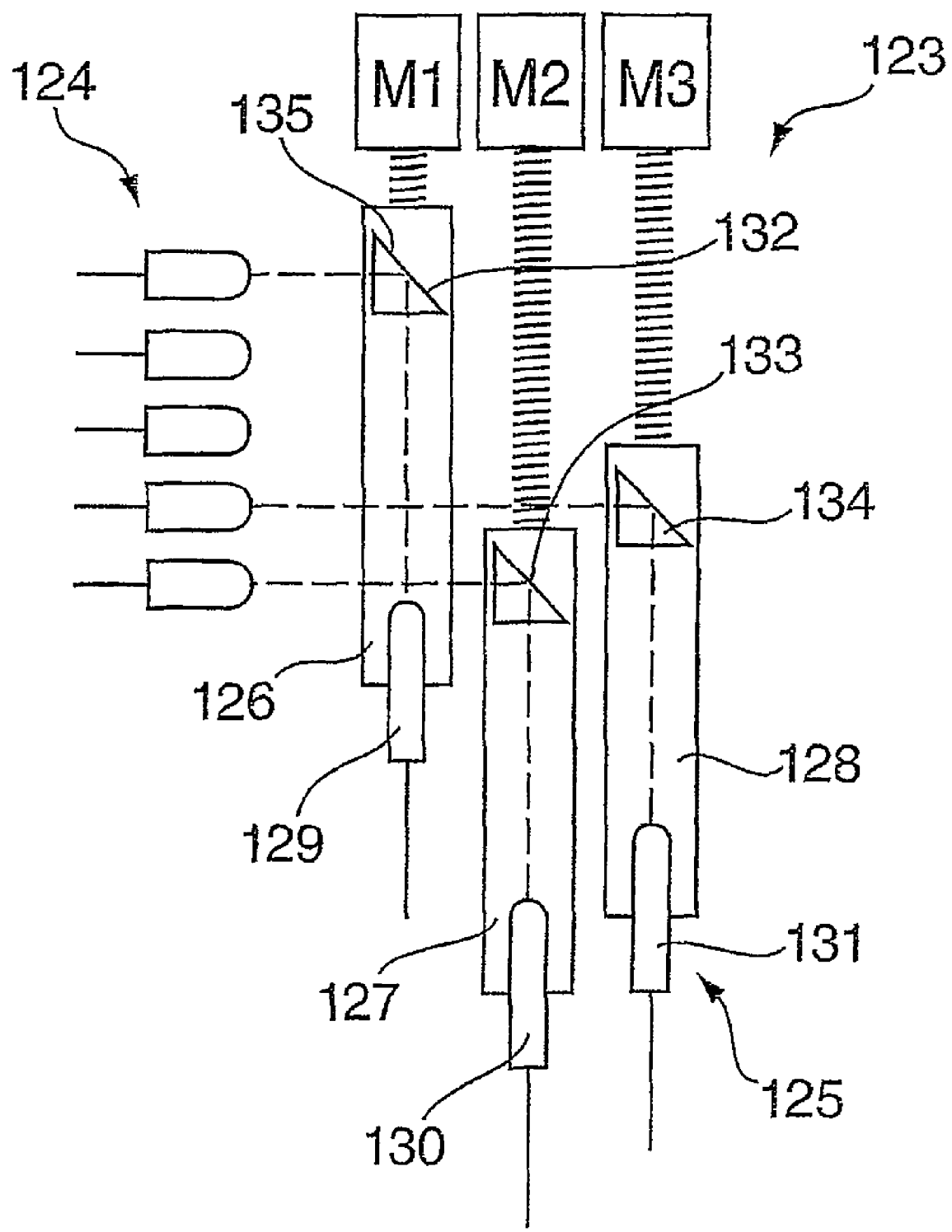
FIG. 8 shows a sliding switch in plan view.

FIG. 8 shows a further embodiment of the invention in the form of a switch 123 with five input ports 124 and three output ports 125, a number of slides 126, 127 and 128 are provided to respectively secure at one extremity collimators 129, 130 and 131. These collimators are moved along with their respective slides by the action of slide drive M1, M2 and M3. Appropriate fibre handling would be provided to allow the movement of the three output collimators. Each slide comprises a prism 132, 133 and 134 respectively. The prisms are configured to have a facet 135 to deflect a received beam of light from the input collimator towards an output collimator such as 129. Dependent upon the position of the prism, any of the beams emitted from the input collimators may be captured and directed towards any appropriate output collimator.

Figure 9:
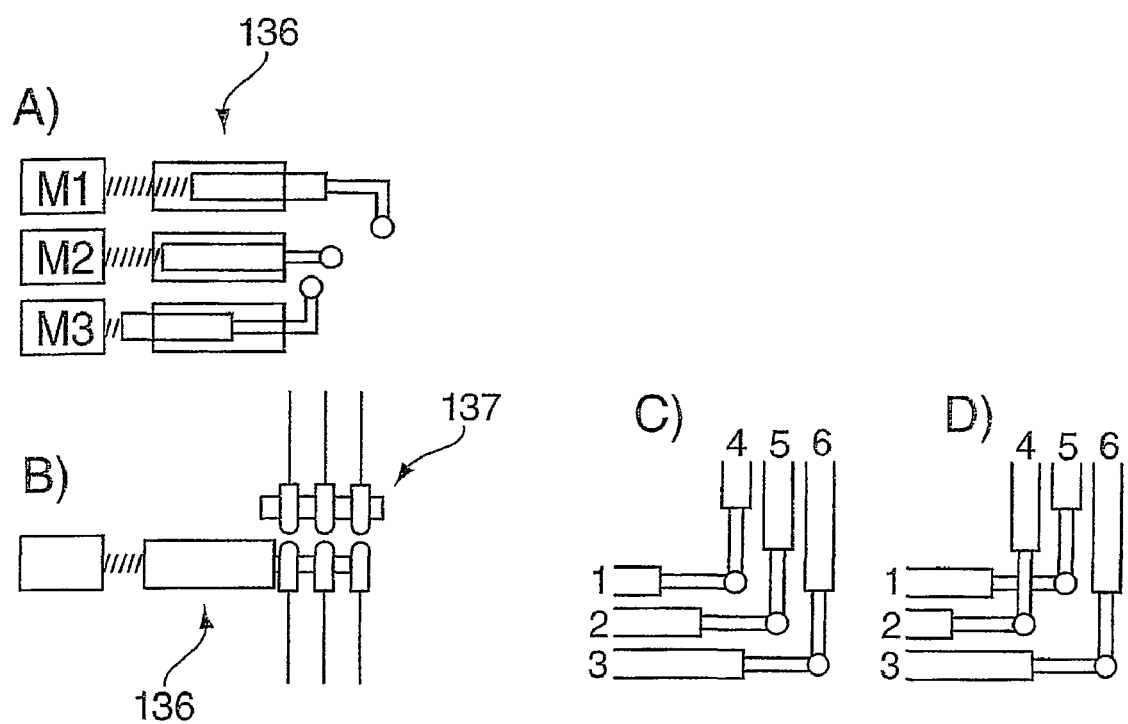
FIG. 9 show a further embodiment of a switch with sliding rods.

FIGS. 9a, b, c and d show respective views of an alternative embodiment of the invention with two arrays 136 and 137 of linear slide mounted collimators is provided. The collimators of array 137 are disposed to face the collimators of array 136. The arrays slide linearly in directions at a right angle from one another. This allows port 1 to be, for example, in optical communication with port 4 whilst port 4 is in communication with port 5 and port 3 is in communication with port 6 (see FIG. 9c). The position of the different collimators may be adjusted so that, for example, port 1 is in communication with port 5 whilst port 2 is in communication with port 4 and port 3 is in communication with port 6. This configuration allows optical communication to occur between any input and output port whilst avoiding any beam blocking during switch reconfiguration. This also permits near zero path length between input and output collimators.

The invention claimed is:

1. An optical switch comprising:
  a plurality of input ports and a plurality of output ports;
  a plurality of displaceable optical elements for directing beams from a selected input to a selected output; and
  a first periscope prism for capturing a beam from an input port and directing a beam towards a second periscope prism for capturing a beam exiting from said first periscope prism and directing a beam to an output port;
  wherein one of said periscope prisms is said displaceable optical element whilst in communication with its corresponding periscope prism to direct a beam from a selected input port to a selected output port.

2. An optical switch comprising:
  a plurality of input ports and a plurality of output ports fixed in position;
  a plurality of displaceable optical elements for directing beams from a selected input to a selected output;
  a first reflective arrangement for capturing a beam from an input port and directing a beam towards a second reflective arrangement for capturing a beam exiting from said first reflective arrangement and directing a beam to an output port;
  wherein one of said reflective arrangements is said displaceable optical element whilst in communication with its corresponding reflective arrangement which is fixed and a plurality of pairs of first and second reflective arrangements are provided to direct a beam from a selected input port to a selected output port; and
  wherein either of said reflective arrangements is a periscope prism.

3. An optical switch comprising:
  a plurality of input ports and a plurality of output ports fixed in position;
  a plurality of displaceable optical elements for directing beams from a selected input to a selected output;
  a first reflective arrangement for capturing a beam from an input port and directing a beam towards a second reflective arrangement for capturing a beam exiting from said first reflective arrangement and directing a beam to an output port;
  wherein one of said reflective arrangements is said displaceable optical element whilst in communication with its corresponding reflective arrangement which is fixed and a plurality of pairs of first and second reflective arrangements are provided to direct a beam from a selected input port to a selected output port,
  wherein one of the input ports and the output ports are disposed in respective arcs and said displacement is a rotation whilst the first and second reflective arrangements communicate along the axis of rotation.

4. An optical switch according to claim 3, wherein the input ports and output ports arcs are concentric.

5. An optical switch, comprising:
  a plurality of input ports and a plurality of output ports fixed in position;
  a plurality of displaceable optical elements for directing beams from a selected input to a selected output;
  a first reflective arrangement for capturing a beam from an input port and directing a beam towards a second reflective arrangement for capturing a beam exiting from said first reflective arrangement and directing a beam to an output port;
  wherein one of said reflective arrangements is said displaceable optical element whilst in communication with its corresponding reflective arrangement which is fixed and a plurality of pairs of first and second reflective arrangements are provided to direct a beam from a selected input port to a selected output port,
  wherein said input ports and said output ports are disposed in respective arcs and both the first and second reflective arrangements are periscope prisms of different lengths corresponding to the radii of receptive input port and output port arcs.

6. An optical switch according to claim 2, further comprising an element for displacing a displaceable reflective arrangement during switching into a position where during displacement said arrangement does not interfere with communication between ports other than the object switching ports.

7. An optical switch, comprising:
  a plurality of input ports and a plurality of output ports fixed in position;
  a plurality of displaceable optical elements for directing beams from a selected input to a selected output;
  a first reflective arrangement for capturing a beam from an input port and directing a beam towards a second reflective arrangement for capturing a beam exiting from said first reflective arrangement and directing a beam to an output port;
  wherein one of said reflective arrangements is said displaceable optical element whilst in communication with its corresponding reflective arrangement which is fixed and a plurality of pairs of first and second reflective arrangements are provided to direct a beam from a selected input port to a selected output port,
  wherein the displacement of said displaceable reflective arrangements is carried out by a plurality of rotary motors stacked substantially perpendicular to the longitudinal axis of the switch and a mechanism joins said rotary motors to said displaceable reflective arrangements; whereby the reflective arrangement rotate about the longitudinal axis of the switch.

* * * * *